(12) United States Patent
Miyazaki et al.

(10) Patent No.: US 10,985,810 B2
(45) Date of Patent: Apr. 20, 2021

(54) USER TERMINAL, WIRELESS BASE STATION, AND WIRELESS COMMUNICATION METHOD

(71) Applicant: NTT DOCOMO, INC., Tokyo (JP)

(72) Inventors: Hiroyuki Miyazaki, Tokyo (JP); Satoshi Suyama, Tokyo (JP); Jun Mashino, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/489,152

(22) PCT Filed: Feb. 26, 2018

(86) PCT No.: PCT/JP2018/007014
§ 371 (c)(1),
(2) Date: Aug. 27, 2019

(87) PCT Pub. No.: WO2018/159550
PCT Pub. Date: Sep. 7, 2018

(65) Prior Publication Data
US 2019/0393933 A1    Dec. 26, 2019

(30) Foreign Application Priority Data
Feb. 28, 2017   (JP) .............................. 2017-037317

(51) Int. Cl.
*H04W 4/00* (2018.01)
*H04B 7/0452* (2017.01)
(Continued)

(52) U.S. Cl.
CPC ......... *H04B 7/0452* (2013.01); *H04B 7/0417* (2013.01); *H04B 7/0456* (2013.01); *H04J 11/0026* (2013.01)

(58) Field of Classification Search
None
See application file for complete search history.

(56) References Cited

U.S. PATENT DOCUMENTS

2015/0003547 A1* 1/2015 Maaref ............... H04B 7/0426
375/267
2016/0164583 A1* 6/2016 Zhang ................ H04B 7/0617
375/267
(Continued)

FOREIGN PATENT DOCUMENTS

WO   2016/140276 A1   9/2016

OTHER PUBLICATIONS

Written Opinion for corresponding International Application No. PCT/JP2018/007014, dated May 29, 2018 (11 pages).
(Continued)

*Primary Examiner* — Clemence S Han
(74) *Attorney, Agent, or Firm* — Osha Bergman Watanabe & Burton LLP

(57) ABSTRACT

User terminal 20 configured to perform MIMO transmission with radio base station 10 includes: control section 200 configured to generate first channel estimation information based on a reference signal transmitted by radio base station 10, and perform an operation for elimination of an interference signal on the first channel estimation information to generate second channel estimation information; and postcoder 208 configured to perform postcoding, based on the second channel estimation information, on a data signal to be transmitted by the radio base station 10, so as to detect a desired signal.

6 Claims, 6 Drawing Sheets

(51) Int. Cl.
   *H04B 7/0417*   (2017.01)
   *H04B 7/0456*   (2017.01)
   *H04J 11/00*    (2006.01)

(56) References Cited

U.S. PATENT DOCUMENTS

2018/0048363 A1    2/2018  Okuyama et al.
2019/0058502 A1*   2/2019  Tsiaflakis .................. H04B 3/32

OTHER PUBLICATIONS

International Search Report for corresponding International Application No. PCT/JP2018/007014, dated May 29, 2018 (5 pages).
S. Yoshioka et al.; "Performance Evaluation of Massive MIMO with Digital Beamforming in Low SHF Bands for 5G"; IEICE Technical Report, vol. 115, No. 472, RCS2015-378, pp. 261-266, Mar. 2016 (6 pages).
Q Spencer et al.; "Zero-Forcing Methods for Downlink Spatial Multiplexing in Multiuser MIMO channels," IEEE Transactions on Signal Processing, vol. 53, No. 2, pp. 461-471, Feb. 2004 (28 pages).
Office Action issued in Japanese Application No. 2017-037317; dated Nov. 10, 2020 (7 pages).

\* cited by examiner

USER TERMINAL, WIRELESS BASE STATION, AND WIRELESS COMMUNICATION METHOD

TECHNICAL FIELD

The present invention relates to a user terminal, radio base station, and radio communication method.

BACKGROUND ART

Long Term Evolution (LTE) has been specified for achieving a higher data rate, lower latency, and the like in a Universal Mobile Telecommunications System (UMTS) network. Successor systems of LTE have also been studied for achieving a broader bandwidth and a higher speed based on LTE. Examples of successor systems of LTE include the systems called LTE-Advanced (LTE-A). Future Radio Access (FRA), 5th generation mobile communication system (5G), 5G plus (5G+), New Radio Access Technology (New-RAT), and the like.

In a future radio communication system (for example, 5G), the use of Massive MIMO (Multiple Input Multiple Output) using a large number of antenna elements (for example, 100 elements or more) in a high frequency band (for example, 5 GHz or higher) is studied to further increase the speed and reduce the interference in signal transmission.

Multiuser MIMO (MU-MIMO) in which multiple beams are multiplexed for data transmission to multiple user terminals is known as a mode of utilization of Massive MIMO.

Examples of techniques of controlling beams or streams in MIMO include a method of combining digital precoding, analog fixed beamforming (BF), and channel status information (CSI) (for example, see Non-Patent Literature (hereinafter referred to as "NPL") 1).

In addition, using a block diagonalization precoding matrix is known as a technique for avoiding interference among reception signals to be received by user terminals in MIMO (for example, see NPL 2). By this technique, channels of user terminals are orthogonalized, so that the interference among the reception signals to be received by user terminals is avoided.

CITATION LIST

Non-Patent Literature

NPL 1
Shohei Yoshioka, Tatsuki Okuyama. Satoshi Suyama, and Yukihiko Okumura "Performance Evaluation of Massive MIMO with Digital Beamforming in Low SHF Bands for 5G." IEICE Tech. Rep., vol. 116. No. 396, RCS2016-238, pp. 13-18, January 2017

NPL 2
Q. H. Spencer, A. L. Swindlehurst. and M. haartd. "Zero-Forcing Methods for Downlink Spatial Multiplexing in Multiuser MIMO channels," IEEE Trans. Sig. Processing, vol. 53, no. 2, pp. 461-471, February 2004.

SUMMARY OF INVENTION

Technical Problem

However, with the aforementioned block diagonalization precoding matrix, when the total number of receive antennas of multiple user terminals is greater than the number of beams transmitted by a base station, channels for user terminals are not orthogonalized partially and, thus the interference among reception signals to be received by the user terminals arises.

In one aspect of the present invention, a user terminal, radio base station, and radio communication method making it possible to prevent the interference among reception signals to be received by multiple user terminals in MU-MIMO, even when the total number of receive antennas of the multiple user terminals is greater than the number of beams transmitted by the base station are provided.

Solution to Problem

A user terminal configured to perform MIMO transmission with a radio base station according to an embodiment of the present invention includes: a control section configured to generate first channel estimation information based on a reference signal transmitted by the radio base station, and perform an operation for elimination of an interference signal on the first channel estimation information to generate second channel estimation information; and a postcoder configured to perform postcoding, based on the second channel estimation information, on a data signal to be transmitted by the radio base station, so as to detect a desired signal.

Advantageous Effects of Invention

According to one aspect of the present invention, interference among reception signals to be received by multiple user terminals can be prevented in MU-MIMO, even when the total number of receive antennas of the multiple user terminals is greater than the number of beams transmitted by a base station.

DESCRIPTION OF EMBODIMENTS

Hereinafter, embodiments of the present invention will be described in detail with reference to the accompanying drawings.

Note that, reference signs, as in "radio base station 10A" and "radio base station 10B." may be used for describing elements of the same kind while distinguishing them from each other, and only common numbers of the reference signs, as in "radio base stations 10," may be used for describing elements of the same kind without distinguishing them from each other.

Note also that, unless specifically stated otherwise or considered as theoretically clearly indispensable, constituent elements (including element step) in the following embodiment of the present invention are not necessarily indispensable.

Hereinafter, descriptions are given in relation to the case where Multi-User MIMO (MU-MIMO) transmission in which streams are transmitted to multiple user terminals while being multiplexed by stream distribution among the multiple user terminals is performed. In addition, hereinafter, the descriptions are also given in relation to the case where beam forming (BF) is performed in Massive MIMO.

<Configuration of Radio Communication System>

To begin with, a configuration of a radio communication system is described.

Figure 1:
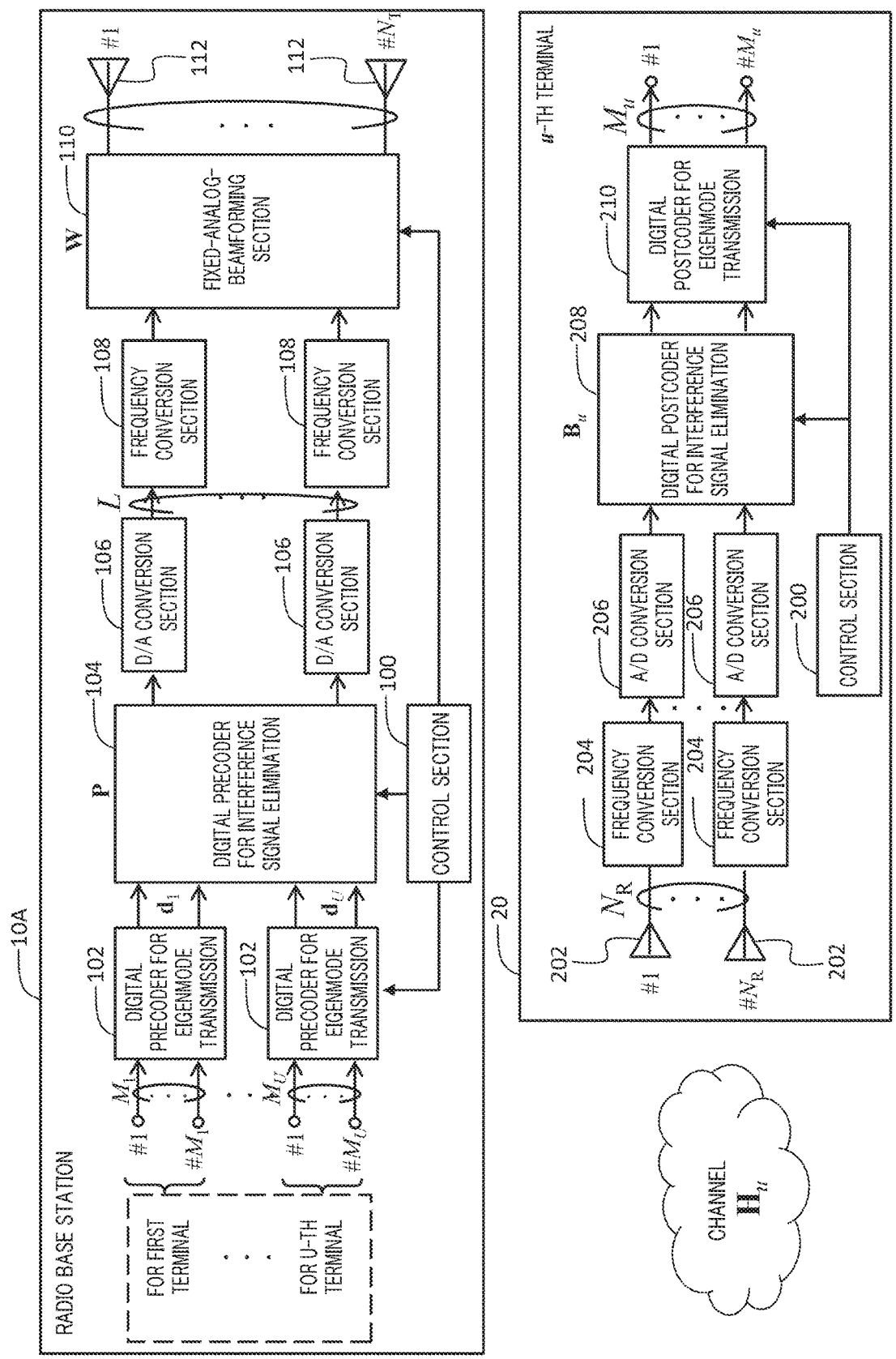
FIG. 1 is a block diagram illustrating a configuration of a radio communication system configured to perform MU-MIMO according to an embodiment of the present invention.

FIG. 1 is a block diagram illustrating the configuration of the radio communication system configured to perform MU-MIMO according to an embodiment of the present invention.

A radio communication system includes radio base station (hereinafter referred to as "base station") 10A and multiple user terminals (hereinafter referred to as "terminals") 20. The radio communication path between base station 10 and terminals 20 is called channel. Since the relative positional relationships between base station 10 and terminals 20 differ from one another, the channels between base station 10 and terminals 20 also differ from one another. In the embodiment of the present invention, the channel between base station 10 and the u-th terminal 20 is expressed as $H_u$.

<Configuration of Radio Base Station>

In FIG. 1, base station 10A includes control section 100, digital precoders for eigenmode transmission (hereinafter referred to as "eigenmode precoders") 102, digital precoder for interference signal elimination (hereinafter referred to as "interference elimination precoder") 104, D/A conversion sections 106, frequency conversion sections 108, fixed-analog-beamforming section 110, and multiple transmit antenna elements 112.

Control section 100 estimates the channels (for example, equivalent channels) between base station 10A and terminals 20. For example, control section 100 generates first channel estimation information based on beam information received from each of terminals 20. The beam information includes information on received power of a beam received by each of terminals 20, for example.

Control section 100 transmits, to terminals 20, indication that it is necessary to generate second channel estimate information when the total number of receive antenna elements 202 of multiple terminals 20 is greater than the number of beams to be transmitted by base station 10A, or, control section 100 transmits, to terminal 20, indication that it is unnecessary to generate the second channel estimate information when the total number of receive antenna elements 202 of multiple terminals 20 is not greater than the number of beams to be transmitted by base station 10A.

Control section 100 performs an operation for elimination of an interference signal on the first channel estimation information to generate the second channel estimation information when it is necessary to generate the second channel estimation information. The first channel estimation information and the second channel estimation information are expressed respectively by first and second channel matrices. The second channel matrix is a matrix computed by performing, on the first channel matrix, a matrix operation for elimination of interference signal (for example, precoding matrix multiplication).

Control section 100 controls eigenmode precoders 102, interference elimination precoder 104, and fixed-analog-beamforming section 110 using the first channel estimation information or the second channel estimation information.

$M_u$ sequences of stream signals to be transmitted to the u-th terminal 20 are input into each of eigenmode precoders 102. Each of eigenmode precoders 102 performs an operation for enabling the eigenmode transmission on the $M_u$ sequences of input stream signals so as to generate transmission signals d and outputs transmission signals $d_u$.

Transmission signals $d_1, \ldots, d_u$ are input into interference elimination precoder 104 from each of eigenmode precoders 102. Interference elimination precoder 104 converts those input transmission signals $d_1, \ldots, d_U$ using either one of the first and the second channel estimation information and outputs L sequences of beam signals. Control section 100 controls as to which of the first and the second channel estimation information is used.

The L sequences of signals output by interference elimination precoder 104 are respectively converted from digital to analog by D/A conversion sections 106, the frequencies of the L sequences of signals respectively are upconverted by frequency conversion sections 108, and the L sequences of signals are input to fixed-analog-beamforming section 110.

Fixed-analog-beamforming section 110 applies a beamforming matrix (hereinafter referred to as "beam matrix") W to the L sequences of input signals to generate $N_T$ sequences of signals. "$N_T$" denotes the number of transmit antenna elements 112. Here, beam matrix W includes $N_T$ rows and L columns. N-r sequences of multiple signals are respectively transmitted from multiple transmit antenna elements 112.

<Configuration of User Terminal>

In FIG. 1, user terminal 20 includes control section 200, multiple receive antenna elements 202, frequency conversion sections 204, A/D conversion sections 206, digital postcoder for interference signal elimination (hereinafter referred to as "interference elimination postcoder") 208, and digital postcoder for eigenmode transmission (hereinafter referred to as "eigenmode postcoder") 210.

Control section 200 estimates the channels (for example, equivalent channels) between base station 10A and terminals 20. For example, control section 200 generates first channel estimation information based on a reference signal that is for estimation of the first channel and that is received from base station 10A.

Control section 200 performs predetermined coding on the first channel estimation information to generate the second channel estimation information when user terminal 20 receives, from base station 10, the indication that it is necessary to generate the second channel estimate information.

Control section 200 controls interference elimination postcoder 208 and eigenmode postcoder 210 using the first channel estimation information or the second channel estimation information.

The frequencies of $N_R$ sequences of multiple reception signals received by $N_R$ sequences of receive antenna elements 202 are respectively downconverted by frequency conversion sections 204, and the $N_R$ sequences of multiple reception signals are respectively converted from analog to digital by A/D conversion sections 206 and are input into interference elimination postcoder 208.

Interference elimination postcoder 208 converts those input reception signals $r_1, \ldots, r_U$ using either one of the first and the second channel estimation information, so as to detect and output desired signal $d_u$. Control section 200 controls as to which of the first and the second channel estimation information is used.

Desired signal $d_u$ is input into eigenmode postcoder 210 from interference elimination postcoder 208. Eigenmode postcoder 210 performs an operation for enabling the eigenmode transmission on desired signal $d_u$, so as to generate and output $M_u$ sequences of stream signals.

<Expression of Reception Signal>

Next, an example of expression of the reception signal received by terminal 20 is described.

The reception signal can be expressed by following Equation 1, for example.

[1]

$$r_u = H_u W P \begin{bmatrix} d_1 \\ \vdots \\ d_U \end{bmatrix} + z_u \qquad \text{(Equation 1)}$$

In Equation 1, "U" denotes the total number of terminals, "$r_u$" denotes the reception signal matrix of u-th terminal 20, "$H_u$" denotes the channel matrix of u-th terminal 20. "W" denotes the beam matrix. "P" denotes the block diagonalization precoding matrix, "$[d_1 \ldots d_U]^T$" denotes the transmission-signal matrix, and "$z_u$" denotes a noise included in the reception signal received by u-th terminal 20. "T" denotes a transposed matrix.

Note that, although the embodiment of the present invention is described using block diagonalization precoding matrix P, this embodiment is a mere example in every respect and any other preceding matrix may be used. Note also that, block diagonalization preceding matrix P may simply be called "precoding matrix P" in the embodiment of the present invention.

Assuming that the number of receive antenna elements of u-th terminal 20 is denoted by "$N_R$," the number of transmit antennas of base station 10 is denoted by "$N_T$," the number of beams to be transmitted by base station 10 is denoted by "L," and the total number of streams to be transmitted by base station 10 is denoted by "M," the numbers of sequences of each of the matrices in Equation 1 are as follows.

The number of row sequences of reception signal matrix $r_u$ is $N_R$.

The number of row sequences and the number of column sequences of channel matrix $H_u$ are $N_R$ and $N_T$, respectively.

The number of row sequences and the number of column sequences of beam matrix W are $N_T$ and L, respectively.

The number of row sequences and the number of column sequences of preceding matrix P are L and M, respectively.

The number of row sequences of transmission-signal matrix $[d_1 \ldots d_U]^T$ is M.

Following Equation 2 is obtained from Equation 1 by considering channel matrix $H_u$ and beam matrix W as one channel matrix $\tilde{H}_u$.

[2]

$$r_u = \tilde{H}_u P \begin{bmatrix} d_1 \\ \vdots \\ d_U \end{bmatrix} + z_u \qquad \text{(Equation 2)}$$

In Equation 2, the number of row sequences and the number of column sequences of channel matrix $\tilde{H}_u$ are $N_R$ and L, respectively.

<First Estimation Processing>

Next, first estimation processing by first terminal 20 is described. The first estimation processing is processing to detect a desired signal by block diagonalization precoding matrix P. Note that, the following description is a mere example in every respect and the first estimation processing is not limited to the example.

When Equation 2 is applied for first terminal 20, following Equation 3 is obtained. Note that, channel matrix $\tilde{H}_u$ and precoding matrix P are combined and collectively considered as new channel matrix $\hat{H}_u$.

[3]

$$r_1 = \tilde{H}_1 P \begin{bmatrix} d_1 \\ \vdots \\ d_U \end{bmatrix} + z_1 =$$

$$\hat{H}_1 \begin{bmatrix} d_1 \\ \vdots \\ d_U \end{bmatrix} + z_1 = \begin{bmatrix} \hat{H}_{1,1} & \ldots & \hat{H}_{1,U} \end{bmatrix} \begin{bmatrix} d_1 \\ \vdots \\ d_U \end{bmatrix} + z_1 \qquad \text{(Equation 3)}$$

Here, $\hat{H}_{u,u'}$ denotes a channel matrix corresponding to transmission signal $d_{u'}$ of another terminal 20, and the number of row sequences and the number of column sequences of the channel matrix are $N_R$ and $M_{u'}$, respectively.

When $N_R U \leq L$, channel matrix $[\hat{H}_{1,2} \ldots \hat{H}_{1,U}]$ for other terminals 20 in channel matrix $[\hat{H}_{1,1} \ldots \hat{H}_{1,U}]$ in Equation 3 is altogether made "0" by block diagonalization precoding matrix P. Thus, following Equation 4 is obtained from Equation 3.

[4]

$$r_1 = \begin{bmatrix} \hat{H}_{1,1} & 0 & \ldots & 0 \end{bmatrix} \begin{bmatrix} d_1 \\ \vdots \\ d_U \end{bmatrix} + z_1 = \hat{H}_{1,1} d_1 + z_1 \qquad \text{(Equation 4)}$$

Since only desired signal $d_1$ remains according to Equation 4, first terminal 20 can detect desired signal $d_1$.

However, since the maximum number of interference that can be eliminated by block diagonalization is "$L-N_R$," a part of channel matrix $[\hat{H}_2 \ldots \hat{H}_U]$ for other terminals 20 in channel matrix $[\hat{H}_1 \ldots \hat{H}_U]$ in Equation 4 cannot be made "0" when $N_R U > L$.

Accordingly, following Equation 5 different from Equation 4 is obtained from Equation 3.

[5]

$$r_1 = \begin{bmatrix} \hat{H}_{1,1} & \ldots & \hat{H}_{1,\bar{U}} & 0 \end{bmatrix} \begin{bmatrix} d_1 \\ \vdots \\ d_U \end{bmatrix} + \qquad \text{(Equation 5)}$$

$$z_1 = \begin{bmatrix} \hat{H}_{1,1} & \ldots & \hat{H}_{1,\bar{U}} \end{bmatrix} \begin{bmatrix} d_1 \\ \vdots \\ d_{\bar{U}} \end{bmatrix} + z_1$$

Since interference signals $[d_2 \ldots d_{\tilde{U}}]$ which could not be eliminated remain in Equation 5, first terminal 20 cannot detect desired signal $d_1$. In this case, first terminal 20 performs the next second estimation processing.

<Second Estimation Processing>

Next, the second estimation processing by first terminal 20 is described. Second estimation processing is processing to detect a desired signal using postcoding matrix $B_1$. Note that, the following description is a mere example in every respect and the second estimation processing is not limited to the example.

To begin with, as illustrated in following Equation 6, auxiliary channel matrix $\overline{H}_1$ in which channel matrix $\hat{H}_{1,1}$ of first terminal 20 is excluded from channel matrix $[\hat{H}_{1,1} \ldots \hat{H}_{1,\tilde{U}}]$ in Equation 6 is defined.

[6]

$$\overline{H}_1 = [\tilde{H}_{1,2} \ldots \tilde{H}_{1,\tilde{U}}] \quad \text{(Equation 6)}$$

Then, as illustrated in following Equation 7, singular value decomposition is performed on this auxiliary channel matrix $\overline{H}_1$.

[7]

$$\overline{H}_1 = \begin{bmatrix} \overline{U}_1 \\ \overline{\overline{U}}_1 \end{bmatrix} \begin{bmatrix} \overline{\Lambda}_1 \\ 0 \end{bmatrix} \overline{V}_1^H \quad \text{(Equation 7)}$$

Here, "$\overline{U}_1^-$" denotes a matrix including left singular vectors corresponding to positive singular values and "$\overline{\overline{U}}_1^=$" denotes a matrix including left singular vectors corresponding to zero singular values. "$\overline{\Lambda}_1^-$" denotes a diagonal matrix including positive singular values as diagonal elements and "$\overline{V}_1^-$" denotes a unitary matrix including right singular vectors. Note that, "H" denotes a complex conjugate transposed matrix.

First terminal 20 generates postcoding matrix $B_1$ using matrix $\overline{\overline{U}}_1^=$ including the left singular vectors corresponding to zero singular values. Then, first terminal 20 multiplies reception signal $r_1$ by postcoding matrix $B_1$, as illustrated in following Equation 8.

[8]

$$\hat{d}_1 = B_1 r_1 = \overline{\overline{U}}_1^H r_1 = \begin{bmatrix} \overline{\overline{U}}_1^H \hat{H}_{1,1} & \ldots & \overline{\overline{U}}_1^H \hat{H}_{1,\tilde{U}} \end{bmatrix} \begin{bmatrix} d_1 \\ \vdots \\ d_{\tilde{U}} \end{bmatrix} + \quad \text{(Equation 8)}$$

$$\overline{\overline{U}}_1^H z_1 = \begin{bmatrix} \overline{\overline{U}}_1^H \hat{H}_{1,1} & 0 \end{bmatrix} \begin{bmatrix} d_1 \\ \vdots \\ d_{\tilde{U}} \end{bmatrix} + \overline{\overline{U}}_1^H z_1 =$$

$$\overline{\overline{U}}_1^H \hat{H}_{1,1} d_1 + \overline{\overline{U}}_1^H z_1.$$

Since only desired signal $d_1$ remains according to Equation 8, first terminal 20 can detect desired signal $d_1$.

Subsequently, first terminal 20 (eigenmode postcoder) considers matrix $\overline{\overline{U}}_1^H \hat{H}_1$ as one channel matrix, applies the operation for enabling the eigenmode transmission to the channel matrix to generate $M_1$ sequences of stream signals, and outputs the $M_1$ sequences of stream signals.

<Interference Signal Elimination Ability>

Next, the interference signal elimination ability according to the embodiment is described.

Number $N_{I-PR,u}$ of interference signals remaining after the first estimation processing by block diagonalization in u-th terminal 20 is computed by following Equation 9.

[9]

$$N_{I-PR,u} = (M-M_u) - U(L-(U-1)N_R)^+ \quad \text{(Equation 9)}$$

In Equation 9, $(x)^+$ denotes a function by which x is x when x is equal to or greater than zero, or by which x is zero when x is less than zero. "U" denotes the total number of terminals.

Number $N_{I-PO,u}$ of interference signals that can be eliminated by the second estimation processing according to the embodiment of the present invention in u-th terminal 20 is computed by following Equation 10.

[10]

$$N_{I-PO,u} = N_R - M_u \quad \text{(Equation 10)}$$

In Equation 10, "M" denotes the total number of the streams to be transmitted by base station 10. "$M_u$" denotes the number of streams to be transmitted to u-th terminal 20, and "$N_R$" denotes the number of receive antennas of u-th terminal 20.

Accordingly, when $N_{I-PO,u} \geq N_{I-PR,u}$, orthogonal transmission can be achieved.

When $UN_R > L$, following Equation 11 is derived from Equations 9 and 10.

[11]

$$N_{I-PO,u} - N_{I-PR,u} = (N_R - M_u) - (M - M_u) = N_R - M \quad \text{(Equation 11)}$$

According to Equation 11, when $N_R \geq M$ is satisfied (i.e., when the total number of receive antenna elements of terminals 20 is equal to or greater than the total number of streams), the orthogonal transmission can be achieved regardless of the number of terminals.

<Operation>

Next, an operation of base station 10 and terminal 20 according to the embodiment of the present invention is described.

Figure 2:
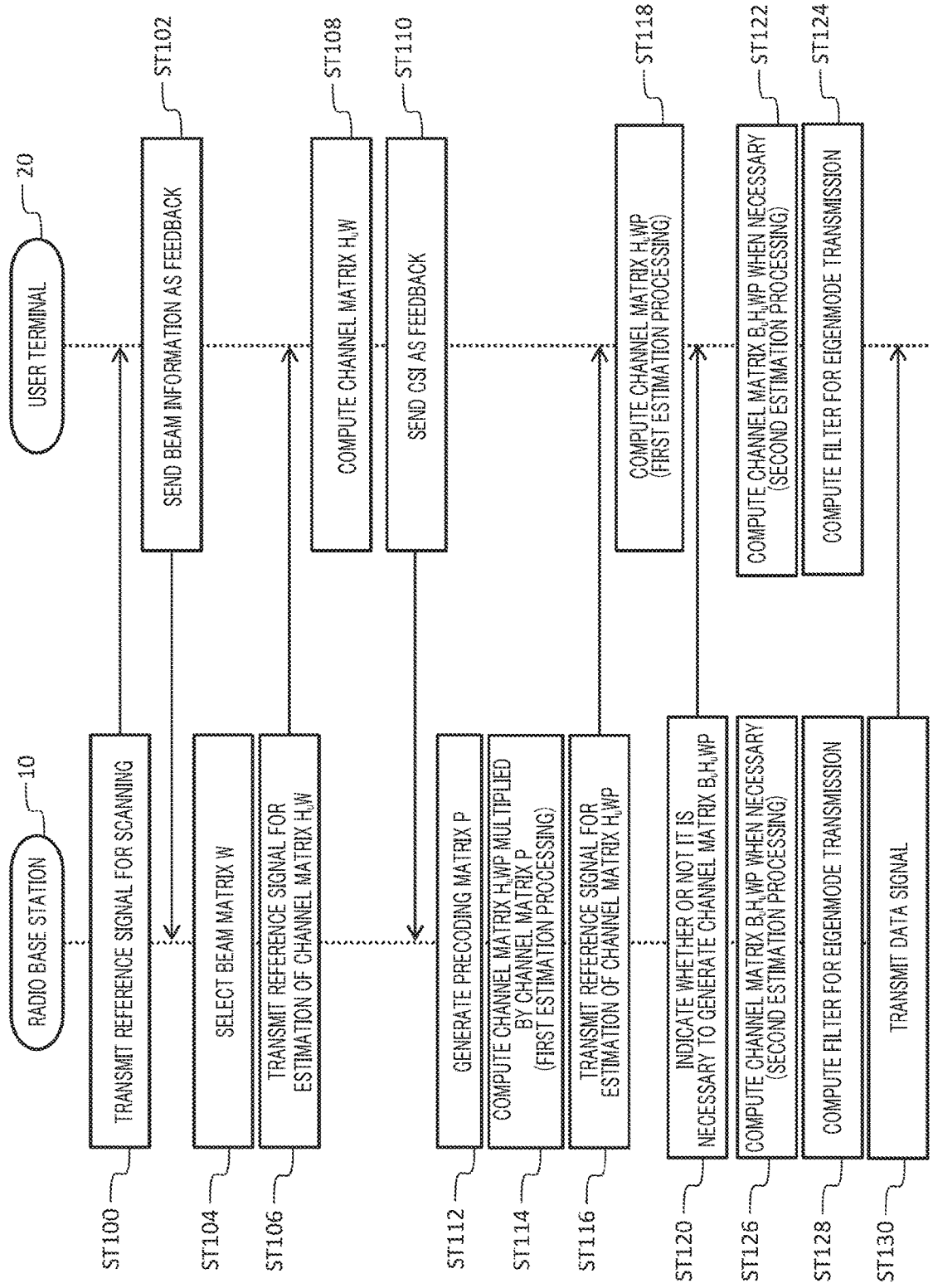
FIG. 2 is a sequence chart illustrating channel estimation processing of a radio base station and the u-th user terminal according to the embodiment of the present invention.

FIG. 2 is a sequence chart illustrating the channel estimation processing of base station 10 and u-th terminal 20 according to the embodiment of the present invention.

Base station 10 controls the beamforming section to transmit beams including reference signals for scanning (ST100).

U-th terminal 20 (control section 200) receives the beams, and transmits information on the beams (as feedback) (referred to as "beam information") to base station 10 (ST102). The beam information includes the received powers of the beams, for example.

Base station 10 (control section 100) receives the beam information, and selects (or generates) beam weight matrix W based on the received beam information (ST104).

Next, base station 10 transmits a reference signal for estimation of channel matrix $H_u W$ to terminal 20 (ST106).

U-th terminal 20 (control section 200) receives the reference signal for estimation of channel matrix $H_u W$, and computes channel matrix $H_u W$ based on the reference signal (ST108).

Then, u-th terminal 20 transmits CSI (as feedback) to base station 10 (ST110).

Base station 10 receives the CSI and generates precoding matrix P based on the CSI (ST112).

Next, base station 10 multiplies channel matrix $H_u W$ estimated in ST108 by preceding matrix P generated in ST112 to compute first channel matrix $H_u WP$ (ST114). This processing corresponds to the aforementioned first estimation processing.

Next, base station 10 transmits a reference signal for estimation of first channel matrix $H_u WP$ to terminal 20 (ST116).

U-th terminal 20 receives the reference signal for estimation of first channel matrix $H_u WP$, and computes first channel matrix $H_u WP$ based on the reference signal (ST118). This processing corresponds to the aforementioned first estimation processing.

In addition, after ST116, base station 10 determines whether or not it is necessary to generate the second channel matrix that is an example of the second channel estimation information, and indicates the determination result to terminal 20 (ST120).

Terminal 20 receives the determination result made in ST120 indicating whether or not it is necessary to generate the second channel matrix. When the determination result indicates that it is necessary to generate the second channel matrix, terminal 20 multiplies first channel matrix $H_u WP$ computed in ST118, by postcoding matrix $B_u$ to compute second channel matrix $B_u H_u WP$ (ST122). This processing corresponds to the aforementioned second estimation processing. Note that, when terminal 20 receives the determination result indicating that it is unnecessary to generate the second channel matrix, terminal 20 does not carry out ST122.

Then, terminal 20 computes a filter for eigenmode transmission (ST124).

Meanwhile, base station 10 multiplies channel matrix $H_u WP$ computed in ST114 by postcoding matrix $B_u$ to compute channel matrix $B_u H_u WP$ when base station 10 determines in ST120 that it is necessary to generate the second channel matrix (ST126). This processing corresponds to the aforementioned second estimation processing. Note that, base station 10 does not carry out ST124 when base station 10 determines in ST120 that it is unnecessary to generate the second channel estimation information.

Then, base station 10 computes the filter for eigenmode transmission (ST128).

Next, base station 10 (eigenmode precoder 102) applies the operation for enabling the eigenmode transmission to $M_u$ sequences of stream signals using the filter for eigenmode transmission to generate transmission signal $d_u$ to be transmitted to terminal 20. Then, base station 10 (interference elimination precoder 104) encodes the transmission signal using second channel matrix $B_u H_u WP$ when the second estimation processing is carried out, or encodes the transmission signal using first channel matrix $H_u WP$ when the second estimation processing is not carried out. Base station 10 then transmits a beam to terminal 20 (ST130).

Terminal 20 (interference elimination postcoder 208) receives the beam, and detects desired signal $d_u$ using second channel matrix $B_u H_u WP$ when the second estimation processing is carried out or using first channel matrix $H_u WP$ when the second estimation processing is not carried out. Then, terminal 20 (eigenmode postcoder 210) applies the operation for enabling the eigenmode transmission using the filter for eigenmode transmission to extract the $M_u$ sequences of stream signals.

Concrete Example

Next, a concrete example according to the embodiment of the present invention is described.

Figure 3:
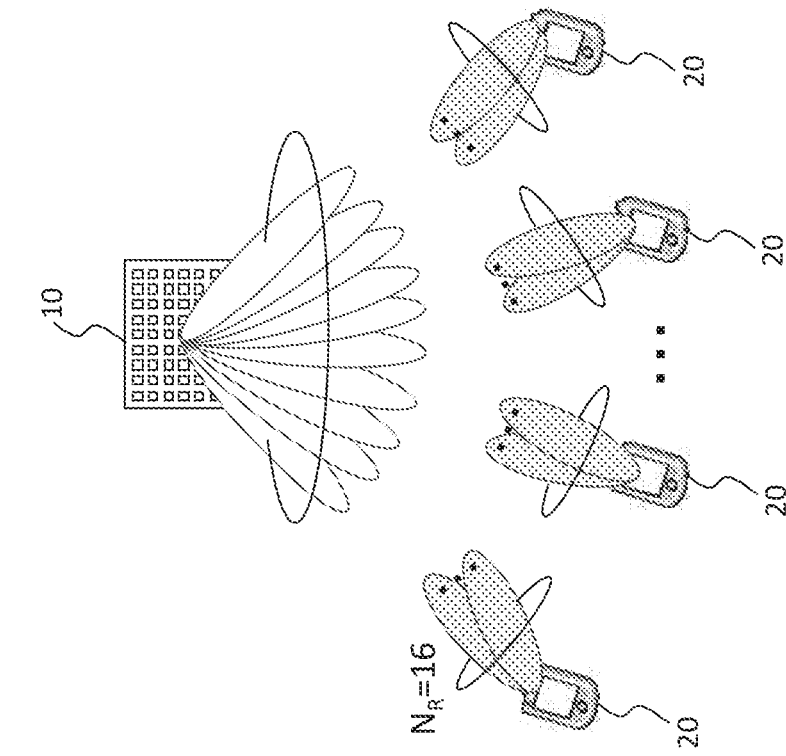
FIG. 3 is a schematic diagram for describing a concrete example according to the embodiment of the present invention.
Figure 3:
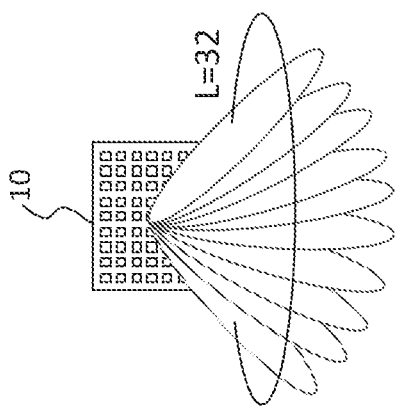
Figure 3:
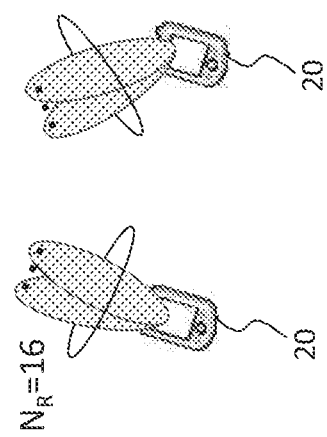

FIG. 3 is a schematic diagram for describing the concrete example according to the embodiment of the present invention.

In FIG. 3, total number M of streams to be transmitted by base station 10 is 16, number L of beams to be transmitted by base station 10 is 32, and number $N_R$ of receive antennas of each of terminals 20 is 16.

In this case, notwithstanding M<L and $M \leq N_R$ as illustrated at (a) in FIG. 3, the number of terminals 20 for which orthogonal multiplexing can be achieved by the traditional block diagonalization is at most only two.

In contrast, in the embodiment of the present invention, the number of terminals 20 for which orthogonal multiplexing can be achieved is at most M terminals according to aforementioned Equation 11 as illustrated at (b) in FIG. 3.

That is, according to the embodiment of the present invention, the throughput of the entire radio communication system can be increased by further reduction of spatial correlation.

<Modification 1 of Configuration of Base Station>

Next, Modification 1 of the configuration of the base station is described.

Figure 4:
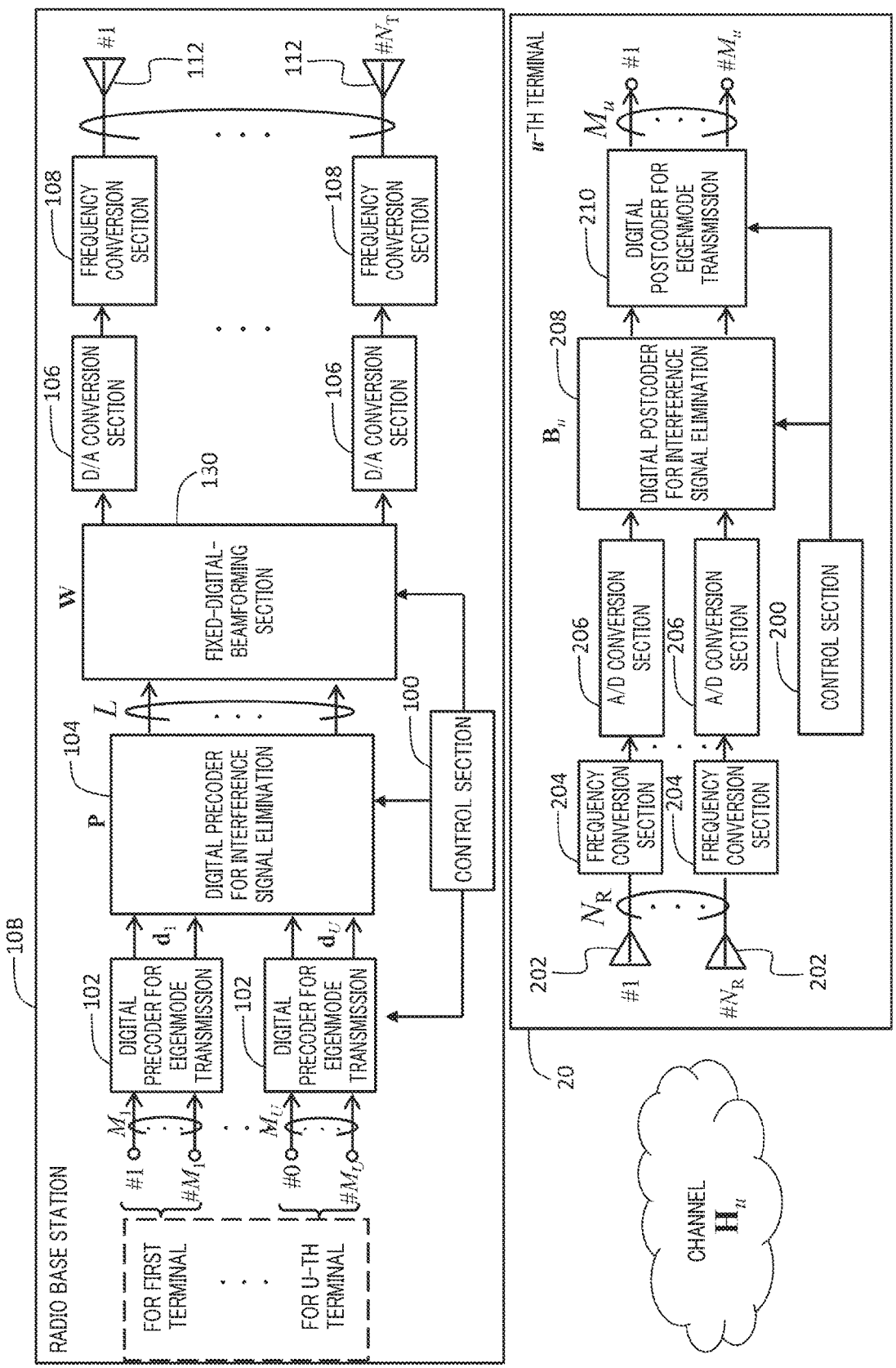
FIG. 4 is a block diagram illustrating Modification 1 of the configuration of the radio communication system configured to perform MU-MIMO according to the embodiment of the present invention.

FIG. 4 is a block diagram illustrating Modification 1 of the configuration of the radio communication system configured to perform MU-MIMO.

The configuration of base station 10A in FIG. 1 is for analog FBCP (Fixed BF and CSI-based Precoding), whereas the configuration of base station 10B in FIG. 4 is for digital FBCP. FIGS. 1 and 4 differ in this point.

That is, fixed-analog-beamforming section 110 is disposed after frequency conversion sections 108 in base station 10A illustrated in FIG. 1, whereas fixed-digital-beamforming section 130 is disposed after interference elimination precoder 104 in base station 10B illustrated in FIG. 4.

The contents described hereinabove can also be achieved when base station 10 includes the configuration for digital FBCP of illustrated in FIG. 4.

<Modification 2 of Configuration of Base Station>

Next, Modification 2 of the configuration of the base station is described.

Figure 5:
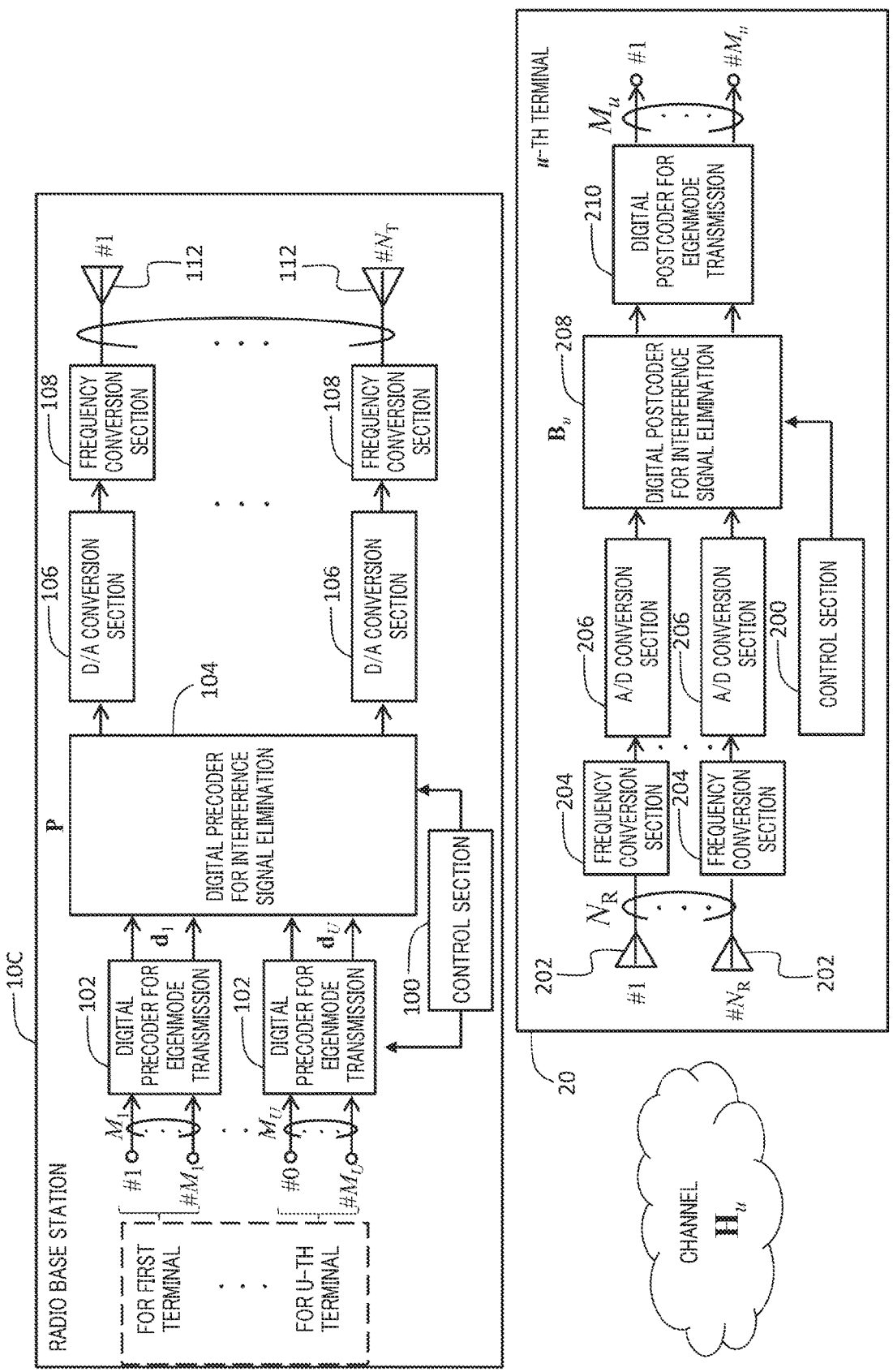
FIG. 5 is a block diagram illustrating Modification 2 of the configuration of the radio communication system configured to perform MU-MIMO according to the embodiment of the present invention.

FIG. 5 is a block diagram illustrating Modification 2 of the configuration of the radio communication system configured to perform MU-MIMO.

Base station 10C in FIG. 5 is different from the aforementioned base stations in FIGS. 1 and 4 in that the configuration of base station 10C is for full digital Massive MIMO.

That is, fixed-digital-beamforming section 130 is disposed after interference elimination precoder 104 in base station 10B illustrated in FIG. 4, whereas no digital beamforming section is disposed after interference elimination precoder 104 in base station 10C illustrated in FIG. 5.

The contents described hereinabove can also be achieved when base station 10 includes the configuration for full digital Massive MIMO as illustrated in FIG. 5.

<Operational Effect>

In contrast to the traditional techniques, main overhead additionally caused in the channels between base station 10 and terminals 20 in the embodiment of the present invention is only the indication in ST120 as to whether or not it is necessary to generate the second channel estimation information. That is, according to the embodiment of the present invention, it is possible to achieve orthogonal multiplexing for the greater number of terminals 20 as compared to the traditional techniques without spending almost any channel resource. Therefore, the throughput of the entire radio communication system can be increased.

Additionally, in contrast to the traditional techniques, main processing loads additionally caused in base station 10 or terminals 20 in the embodiment of the present invention are only the computing processing to compute postcoding matrix B. and the computing processing to compute the channel matrix multiplied by postcoding matrix $B_u$ (that is, computing processing by Equations 6 to 8). That is, according to the embodiment of the present invention, it is possible to achieve orthogonal multiplexing for the greater number of terminals 20 as compared to the traditional techniques without applying almost any processing load to base station 10 and terminals 20.

The embodiments of the present invention have been described above.

Note that, the aforementioned embodiments are described in relation to the case where the base station transmits the reference signals for the channel estimation. However, in the channel estimation, terminals may also transmit the reference signals for the channel estimation, or a channel estimation value (channel information) may also be obtained without the use of reference signals. That is, in channel estimation, the channel information indicating equivalent channel matrix (HW) with BF weights and equivalent channel matrix (HWP) with precoding included in aforementioned equivalent channel matrix (HW) only have to be obtained.

(Hardware Configuration)

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 6:
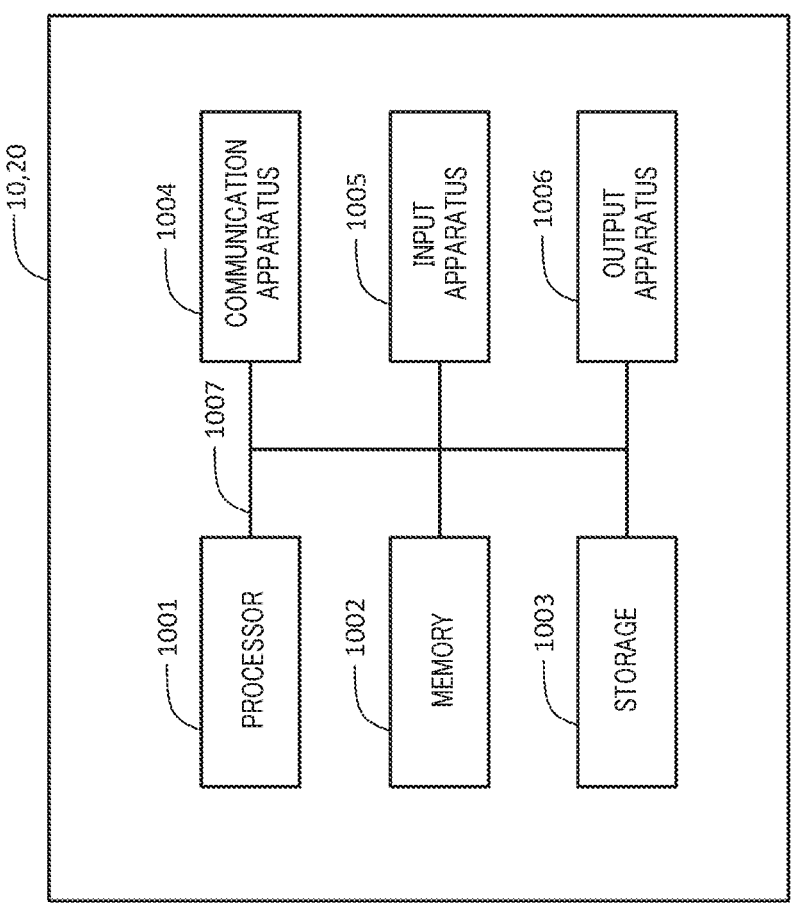
FIG. 6 illustrates an exemplary hardware configuration of a radio base station and a user terminal according to the present invention.

For example, the radio base station, the user terminal, and the like according to an embodiment of the present invention may function as a computer that executes processing of a radio communication method of the present invention. FIG. 6 illustrates an example of a hardware configuration of the radio base station and the user terminal according to an embodiment of the present invention. Radio base station 10 and user terminal 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control section 100, digital precoder 102 for eigenmode transmission, digital precoder 104 for interference signal elimination, D/A conversion section 106, frequency conversion section 108, fixed-analog-beamforming section 110, fixed-digital-beamforming section 130, control section 200, frequency conversion section 204. A/D conversion section 206, digital postcoder 208 for interference signal elimination, digital postcoder 210 for eigenmode transmission, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, at least part of the functional blocks constituting radio base station 10 and user terminal 20 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, antenna element 114 or the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution). LTE-A (LTE-Advanced), SUPER 3G, IMT-Advanced, 4G, 5G FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station", "eNB", "cell", and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

Meaning and Interpretation of Terms

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is. "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be specified by the same name (for example, demodulation RS).

The description "based on" used in the present specification does not mean "based only on." unless otherwise specifically stated. In other words, the description "based on" means both of "based only on" and "based at least on."

The "section" in the configuration of each apparatus may be replaced with "means," "circuit," "device," or the like.

The terms "including," "comprising." and modifications of these terms are intended to be inclusive just like the term "having." as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini slot, and the symbol indicate time units in transmitting signals. The radio frame, the subframe, the slot, the mini slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval), or one mini slot may be called a TTI.

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

Variations and the Like of Aspects

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-37317 filed on Feb. 28, 2017, and the entire content of Japanese Patent Application No. 2017-37317 is hereby incorporated by reference.

INDUSTRIAL APPLICABILITY

An aspect of the present invention is useful for a mobile communication system.

REFERENCE SIGNS LIST 10A, 10B, and 10C Radio Base Station
20 User Terminal
100 Control Section
102 Digital Precoder for Eigenmode Transmission
104 Digital Precoder for Interference Signal Elimination
106 D/A Conversion Section
108 Frequency Conversion Section
110 Fixed-Analog-Beamforming Section
112 Transmit Antenna Element
200 Control Section
202 Receive Antenna Element
206 A/D Conversion Section
208 Digital Postcoder for Interference Signal Elimination
210 Digital Postcoder for Eigenmode Transmission

The invention claimed is:

1. A user terminal configured to perform MIMO transmission with a radio base station, the user terminal comprising:
   a control section configured to generate first channel estimation information based on a reference signal transmitted by the radio base station, and perform an operation for elimination of an interference signal on the first channel estimation information to generate second channel estimation information; and
   a postcoder configured to perform postcoding, based on the second channel estimation information, on a data signal to be transmitted by the radio base station, so as to detect a desired signal, wherein
   the control section generates the second channel estimation information when the user terminal receives, from the radio base station, an indication that it is necessary to generate the second channel estimation information, and
   the indication that it is necessary to generate the second channel estimation information is provided when a total number of antennas of a plurality of user terminals receiving data signals from the radio base station is greater than a total number of beams to be transmitted by the radio base station.

2. The user terminal according to claim 1, wherein:
   the first channel estimation information and the second channel estimation information are respectively expressed by first and second channel matrices;
   the first channel matrix is a matrix computed by a precoding matrix and beamforming matrix in the radio base station; and
   the second channel matrix is a matrix computed by performing a matrix operation for elimination of an interference signal on the first channel matrix.

3. A user terminal configured to perform MIMO transmission with a radio base station, the user terminal comprising:
   a control section configured to generate first channel estimation information based on a reference signal transmitted by the radio base station, and perform an operation for elimination of an interference signal on the first channel estimation information to generate second channel estimation information; and
   a postcoder configured to perform postcoding, based on the second channel estimation information, on a data signal to be transmitted by the radio base station, so as to detect a desired signal, wherein
   the postcoder performs postcoding, based on the first channel estimation information, on the data signal to be transmitted by the radio base station, so as to detect a desired signal when the user terminal receives, from the radio base station, an indication that it is unnecessary to generate the second channel estimation information.

4. The user terminal according to claim 3, wherein:
   the first channel estimation information and the second channel estimation information are respectively expressed by first and second channel matrices;
   the first channel matrix is a matrix computed by a precoding matrix and beamforming matrix in the radio base station; and
   the second channel matrix is a matrix computed by performing a matrix operation for elimination of an interference signal on the first channel matrix.

5. A radio base station configured to perform MIMO transmission with a plurality of user terminals, the radio base station comprising:
   a control section configured to generate first channel estimation information based on beam information transmitted by each of the plurality of user terminals, and perform an operation for elimination of an interference signal on the first channel estimation information to generate second channel estimation information; and
   a precoder configured to perform precoding, based on the second channel estimation information, on a data signal to be transmitted to each of the plurality of user terminals, so as to multiplex the data signal, wherein
   the base station transmits, to a user terminal, an indication that it is necessary to generate the second channel estimation information, and
   the indication that it is necessary to generate the second channel estimation information is transmitted when a total number of antennas of a plurality of user terminals receiving data signals from the radio base station is greater than a total number of beams to be transmitted by the radio base station.

6. A radio communication method for performing MIMO transmission between a radio base station and a plurality of user terminals, the radio communication method comprising:

the following performed by the radio base station:
generating first channel estimation information based on beam information transmitted by each of the plurality of user terminals, and performing an operation for elimination of an interference signal on the first channel estimation information to generate second channel estimation information;
transmitting, to the plurality of user terminals, an indication that it is necessary to generate the second channel estimation information, wherein
the indication that it is necessary to generate the second channel estimation information is transmitted when a total number of antennas of a plurality of user terminals receiving data signals from the radio base station is greater than a total number of beams to be transmitted by the radio base station;
performing precoding, based on the second channel estimation information, on a data signal to be transmitted to each of the plurality of user terminals, so as to multiplex the data signal; and
transmitting the multiplexed data signal to each of the plurality of user terminals; and the following performed by each of the plurality of terminals:
generating the first channel estimation information based on a reference signal transmitted by the radio base station;
performing an operation for elimination of an interference signal on the first channel estimation information to generate the second channel estimation information when the user terminal receives, from the radio base station, the indication that it is necessary to generate the second channel estimation information; and
performing postcoding, based on the second channel estimation information, on the data signal to be transmitted by the radio base station, so as to detect a desired signal.

* * * * *